A. SAUTER.
VEHICLE CAB.
APPLICATION FILED JUNE 23, 1919.

1,378,726.

Patented May 17, 1921.

INVENTOR
ANDREW SAUTER
BY
ATTORNEYS

UNITED STATES PATENT OFFICE.

ANDREW SAUTER, OF DETROIT, MICHIGAN.

VEHICLE-CAB.

1,378,726.   Specification of Letters Patent.   Patented May 17, 1921.

Application filed June 23, 1919. Serial No. 306,147.

*To all whom it may concern:*

Be it known that I, ANDREW SAUTER, a citizen of the United States of America, residing at Detroit, in the county of Wayne and State of Michigan, have invented certain new and useful Improvements in Vehicle-Cabs, of which the following is a specification, reference being had therein to the accompanying drawings.

Many trucks, tractors and other vehicles have driver's seats that expose the driver to the elements, and in some instances large umbrellas, folding tops and aprons have been provided as a protection against rain and sunshine, but such protection means is not sufficient against wintry blasts, sleet and snow, consequently drivers are more or less exposed and as a result health is impaired and the operation of the vehicle interfered with in many ways.

The primary object of my invention is to provide a simple and durable cab that may be easily and quickly installed on a truck, tractor or other vehicle, at the driver's seat to afford ample protection in the winter time and thorough ventilation in the summer time.

Figure 1:
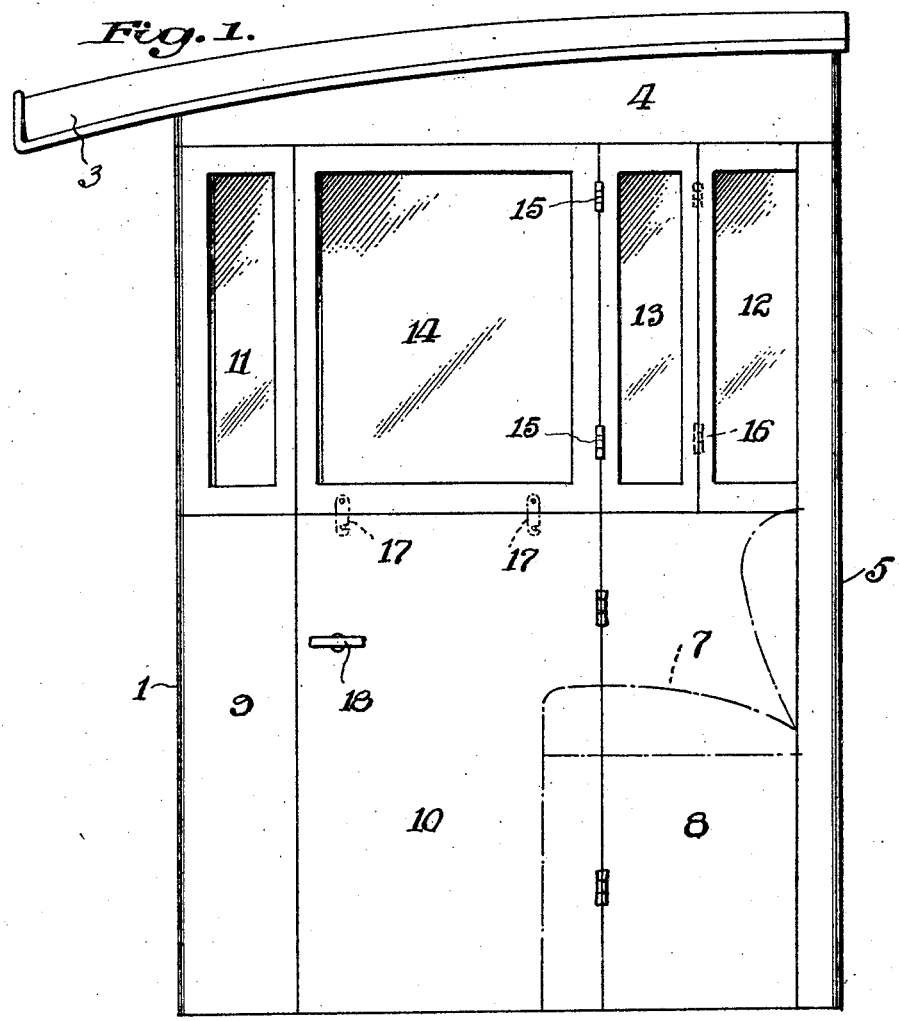
Figure 2:
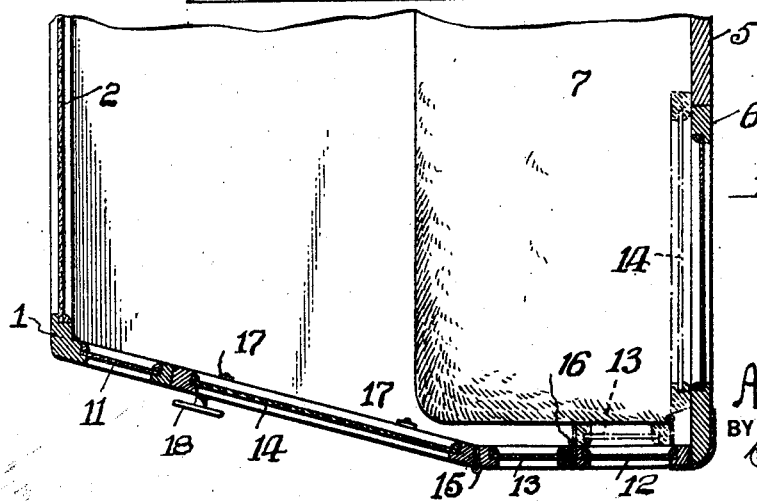

My invention will be hereinafter considered and then claimed, and reference will now be had to the drawing, wherein Figure 1 is a side elevation of the vehicle cab, and Fig. 2 is a horizontal sectional view of a portion of the same.

The vehicle cab comprises a front wall 1 which may have its upper portion provided with a window 2 serving as a windshield and overhanging the upper edge of the front wall 1 is a roof 3 supported by fixed side or roof panels 4 from a rear wall 5 which is disposed in parallelism at the front wall 1 and may have its upper portion provided with one or more windows 6, so that the operator of a truck, tractor or other vehicle who occupies a seat 7 may make rear observations.

The front and rear walls 1 and 5 respectively are connected by side walls, each composed of fixed side panels 8 and 9 and a hinged door panel 10, the panels 9 and 10 being disposed at an angle relative to the panel 8 so that the front portion of the cab panel is of less width than the rear portion thereof. The panels 8, 9 and 10 form the lower portion of each side wall, and the upper portion of each side wall is composed of fixed windows 11 and 12, and foldable windows 13 and 14, the former being hinged to the fixed window 12 and the foldable windows 13 and 14 hinged together, as at 15, with the window 14 forming the upper part of the door.

The foldable or movable window 13 is hinged to the inner edge of the fixed window 12, as at 16 so that it may be swung inwardly against the inner side of the window 12, as shown in dotted lines in Fig. 2, and the manner of hinging the door window 14 to the window 13 is such that the door window will be carried inwardly with the window 13 and placed in parallel registration with the window 6 of the rear wall 5, as also shown by dotted lines. This will leave a wide opening in the upper portion of the side wall of the cab and permit of thorough ventilation within the cab. When the door window 14 is swung over the door panel 10 and in alinement therewith, the door window may be connected to the door panel 10 by clips 17 or other fastening means, so that the door panel 10 and the window 14 may be simultaneously opened and closed. The door panel 10 is hinged in the usual manner, and has a conventional form of latch, lock or handle, generally designated 18 for retaining the door closed.

As shown in Fig. 1, the cab provides an inclosure for the driver's seat and may be advantageously used in the winter time, but in the summer time the windows 13 and 14 can be swung open on both sides of the cab so that there will be plenty of ventilation and yet protect the driver from rain.

I attach considerable importance to the simplicity of construction as it is unnecessary to construct the side wall panels to accommodate windows as is the usual practice in connection with automobile bodies, and furthermore the arrangement of the side windows is such as not to interfere with the driver or other occupant of the seat 7 when the windows are open.

One embodiment of my invention has been illustrated, but it is to be understood that the structural elements are susceptible to such variations and modifications as fall within the scope of the appended claims.

What I claim is:—

1. In a vehicle cab having a rear wall, and a door, a window adapted to be connected with the door for movement therewith, and means constructively arranged for constantly supporting said window relative to the rear wall of the cab and independent of said door so that said window may be bodily swung into parallelism with and against said rear wall.

2. A vehicle cab comprising front, rear, side walls and a roof, fixed windows forming part of each side wall, a movable window hinged to one of said fixed windows and adapted to swing into parallelism therewith, and a door having a window hinged to said movable window to be moved thereby and adapted to be connected to said door for movement therewith.

3. A vehicle cab comprising front, rear, side walls and a roof, fixed windows forming part of the upper portion of each side wall, a hinged door forming part of the lower portion of each side wall, a movable window hinged to one of said fixed windows and adapted to swing into parallelism therewith, a door window hinged to said movable window and adapted to be moved thereby and swung into parallelism with the rear wall of said cab, and means adapted for fixing the door window relative to said door for movement therewith.

4. A vehicle cab inclosing a driver's seat, and including a door, windows, and a door window between said cab windows, one of said cab windows being constructively arranged so it may bodily carry said door window into the cab away from said door and to a position above the driver's seat.

In testimony whereof I affix my signature in the presence of two witnesses.

ANDREW SAUTER.

Witnesses:
KARL H. BUTLER,
ANNA M. DORR.